(12) United States Patent
Chen et al.

(10) Patent No.: US 11,731,159 B2
(45) Date of Patent: Aug. 22, 2023

(54) RECIPROCATING GLUE DISPENSER DISPENSING SWITCH AND DOUBLE LIQUID DISPENSING EQUIPMENT WITH THE SAME

(71) Applicant: Advanced Jet Automation Co., Ltd, New Taipei (TW)

(72) Inventors: Lu-Min Chen, Taipei (TW); Mu-Huang Liu, Taipei (TW); Tsung-Lin Tsai, Taipei (TW)

(73) Assignee: Advanced Jet Automation Co., Ltd, New Taipei (TW)

( * ) Notice: Subject to any disclaimer, the term of this patent is extended or adjusted under 35 U.S.C. 154(b) by 333 days.

(21) Appl. No.: 16/941,568

(22) Filed: Jul. 29, 2020

(65) Prior Publication Data
US 2021/0220865 A1    Jul. 22, 2021

(30) Foreign Application Priority Data
Jan. 16, 2020  (TW) ................................ 109200636

(51) Int. Cl.
*B05C 11/10*   (2006.01)
*B05C 5/02*    (2006.01)
*F16K 3/00*    (2006.01)

(52) U.S. Cl.
CPC ........ *B05C 11/1026* (2013.01); *B05C 5/0204* (2013.01); *B05C 5/0225* (2013.01); *B05C 11/1036* (2013.01); *F16K 3/00* (2013.01)

(58) Field of Classification Search
CPC . B05C 11/1026; B05C 5/0204; B05C 5/0225; B05C 11/1036; B05C 11/1034; B05C 11/1031; B05C 5/0229; B05C 5/02; B29C 65/485; B29C 65/52; B32B 37/1284; B44C 7/04; Y10T 156/1798; F16K 3/00;
(Continued)

(56) References Cited

U.S. PATENT DOCUMENTS 3,462,128 A * 8/1969 Dallois et al. .......... B29B 7/407
                                              222/137
4,477,191 A * 10/1984 Ersfeld ................. B29B 7/7673
                                              222/137
(Continued)

OTHER PUBLICATIONS

CH-659629, Maeder August, "Container for Paste-like Compounds", published Feb. 13, 1987 (Year: 1987).*

*Primary Examiner* — Laura Edwards
(74) *Attorney, Agent, or Firm* — CKC & Partners Co., LLC

(57) ABSTRACT

A reciprocating glue dispenser dispensing switch includes a switching device main body, a needle holding base, a sliding wear-resistant plate, and a driving device. The switching device main body is equipped with a double liquid inlet, the needle holding base is equipped with a mixed glue outlet, the sliding wear-resistant plate is installed between the switching device main body and the needle holding base, and the sliding wear-resistant plate is equipped with a sliding wear-resistant plate opening. The driving device is utilized to move the sliding wear-resistant plate. A mixed double-liquid glue passes through the double liquid inlet, the sliding wear-resistant plate opening and the glue outlet to dispense a mixed double-liquid glue while the double liquid inlet, the sliding wear-resistant plate opening and the glue outlet are overlapped. In addition, a double liquid dispensing equipment is also disclosed herein.

9 Claims, 3 Drawing Sheets

(58) Field of Classification Search
CPC ... F16K 3/02; A61M 5/19; A61M 5/24; B01F 35/751; B01F 35/7547; B01F 35/75471; B01F 35/7545
USPC .......................... 118/300, 684, 710; 366/193
See application file for complete search history.

(56) References Cited

U.S. PATENT DOCUMENTS

| | | | |
|---|---|---|---|
| 4,740,089 A * | 4/1988 | Fiorentini | B29B 7/7668 366/159.1 |
| 2009/0220385 A1* | 9/2009 | Brown | B01F 33/84 422/400 |

* cited by examiner

RECIPROCATING GLUE DISPENSER DISPENSING SWITCH AND DOUBLE LIQUID DISPENSING EQUIPMENT WITH THE SAME

RELATED APPLICATIONS

This application claims priority to Taiwan Application Serial Number 109200636, filed Jan. 16, 2020, which is herein incorporated by reference.

TECHNICAL FIELD

The present disclosure generally relates to a reciprocating glue dispenser dispensing switch. More particularly, the present disclosure relates to a double liquid dispensing equipment having a reciprocating glue dispenser dispensing switch.

BACKGROUND

With the development of science and technology, electronic products are becoming thinner, and the precision thereof is getting higher. Automatic dispenser is an automated device developed for the packaging industry, which drips and controls the glue to package the electronic product. With the development of industrialization, the automatic dispenser reduces the use of human resources, so that the phenomenon of the manpower shortage can be effectively alleviated to a certain extent.

Dispensing technology is also required to be more precise as the display panel module is thinner and the width of the bezel is reduced. The precise dispensing technology is not only applicable to the panel industry, but can also be used on various products that require bonding. With the improvement of the accuracy of dispensing technology, the dispensing technology application is increasingly widespread. At this stage, the dispenser has been widely used in various industries, and the dispenser is essential packaging equipment in the electronics industry. However, as the electronic product is more sophisticated, the display screen is larger and the width of the bezel is smaller, the accuracy and reliability of the dispenser has to be further improved so as to use in different application scope and application industry.

The stability of the dispenser can effectively improve the quality of electronic products. Therefore, there is a need to improve the accuracy and reliability of the dispenser so as to improve the production accuracy in all walks of life as well as reduce production costs, which is especially conducive to the production of precision electronic products.

SUMMARY

One objective of the embodiments of the present invention is to provide a reciprocating glue dispenser dispensing switch to accurately dispense a mixed glue.

To achieve these and other advantages and in accordance with the objective of the embodiments of the present invention, as the embodiment broadly describes herein, the embodiments of the present invention provide a reciprocating glue dispenser dispensing switch including a switching device main body, a needle holding base, a sliding wear-resistant plate and a driving device. The switching device main body has a double liquid inlet, the needle holding base has a mixed glue outlet. The sliding wear-resistant plate is equipped between the switching device main body and the needle holding base. The sliding wear-resistant plate has a sliding wear-resistant plate opening. The driving device can move the sliding wear-resistant plate. In addition, a mixed double-liquid glue passes through the double liquid inlet, the sliding wear-resistant plate opening and the mixed glue outlet to dispense the mixed double-liquid glue when the double liquid inlet, the mixed glue outlet and the sliding wear-resistant plate opening are overlapped.

In some embodiments, the reciprocating glue dispenser dispensing switch further includes a needle fixed to the mixed glue outlet of the needle holding base.

In some embodiments, the reciprocating glue dispenser dispensing switch further includes a driving rod connecting to the driving device and the sliding wear-resistant plate.

In some embodiments, the reciprocating glue dispenser dispensing switch further includes a chute formed between the switching device main body and the needle holding base.

In some embodiments, the sliding wear-resistant plate includes a polytetrafluoroethylene sliding wear-resistant plate.

In some embodiments, the driving device includes a pneumatic cylinder.

In some embodiments, the driving device includes a hydraulic cylinder.

According to another aspect of the present invention, the embodiments of the present invention provide a double liquid dispensing equipment includes a reciprocating glue dispenser dispensing switch and a mixer connecting to the double liquid inlet of the reciprocating glue dispenser dispensing switch.

In some embodiments, the double liquid dispensing equipment further includes a double liquid valve connecting to the mixer. The double liquid valve includes a first liquid supply valve and a second liquid supply valve.

Hence, the reciprocating glue dispenser dispensing switch can accurately dispense the glue for the electronic devices, and avoid causing push pressure on the glue when switching, thereby effectively improving the uniformity and stability in the dispensing process.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
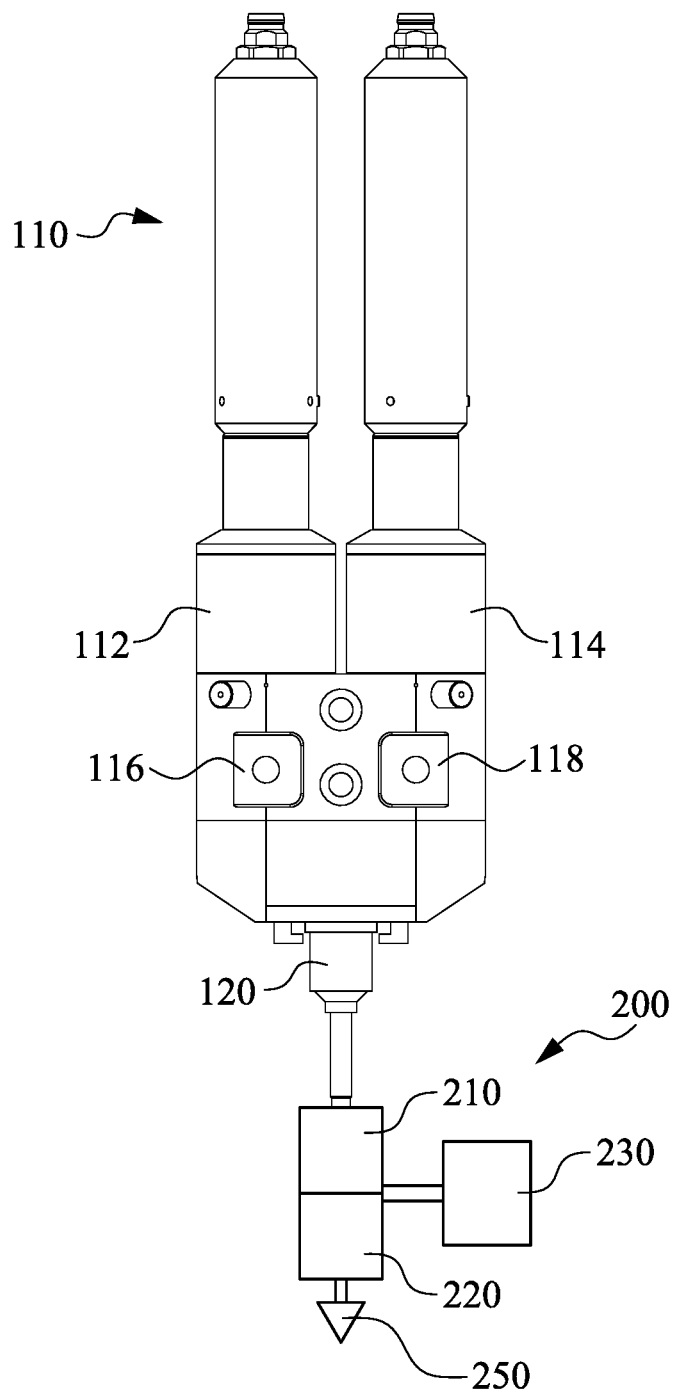
FIG. 1 illustrates a schematic view of a double liquid dispensing equipment according to one embodiment of the present invention.
Figure 2:
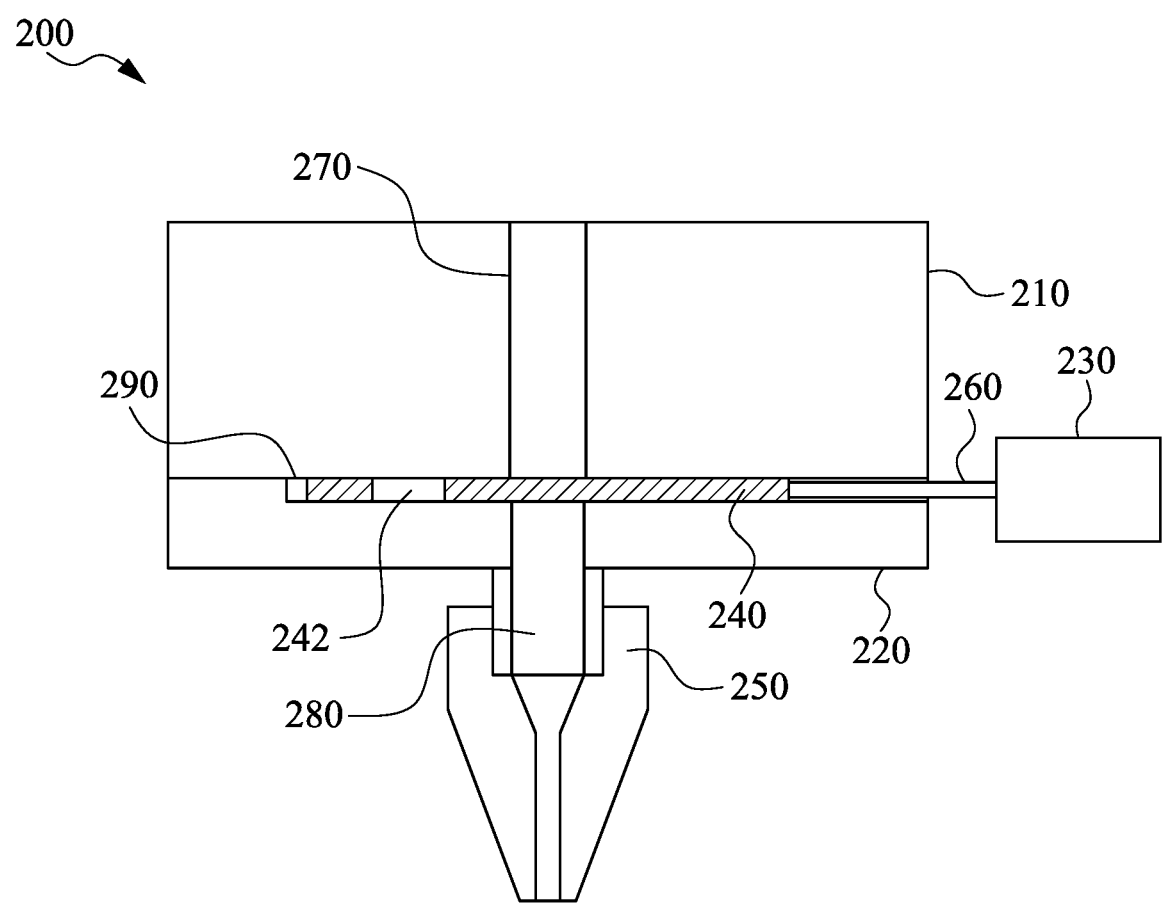
FIG. 2 illustrates a side view of a reciprocating glue dispenser dispensing switch according to one embodiment of the present invention.
Figure 3:
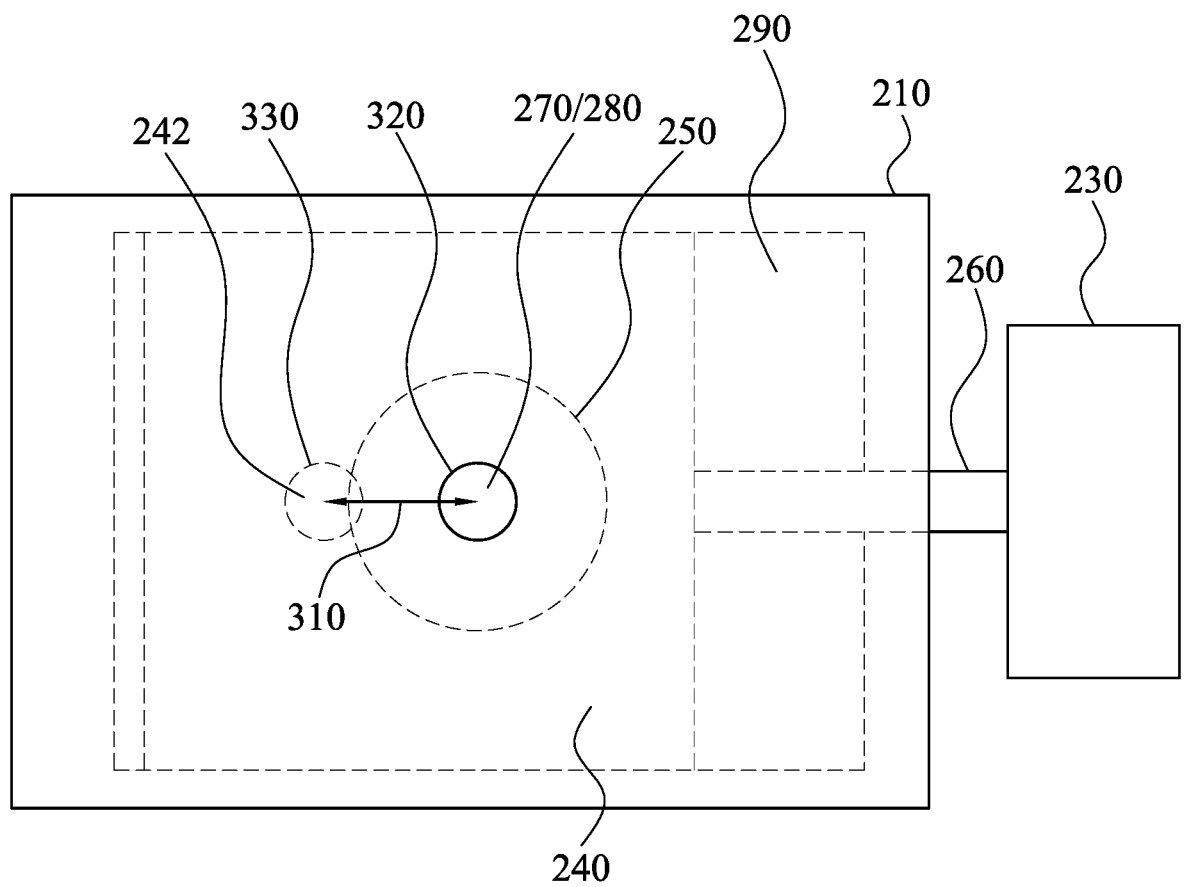
FIG. 3 illustrates a top view of a reciprocating glue dispenser dispensing switch according to one embodiment of the present invention.

FIG. 1 illustrates a schematic view of a double liquid dispensing equipment according to one embodiment of the present invention, FIG. 2 illustrates a side view of a reciprocating glue dispenser dispensing switch according to one embodiment of the present invention, and FIG. 3 illustrates a top view of the reciprocating glue dispenser dispensing switch.

Referring to FIG. 1, the double liquid dispensing equipment 100 includes a double liquid valve 110, a mixer 120 and a reciprocating glue dispenser dispensing switch 200.

The double liquid valve 110 includes a first liquid supply valve 112 and a second liquid supply valve 114 to respectively provide a main agent and a hardener and evenly mix the same in the mixer 120.

The main agent and the hardener are provided from the first liquid inlet 116 and the second liquid inlet 118 of the first liquid supply valve 112 and the second liquid supply valve 114 to the mixer 120 through the rotor and stator of the first liquid supply valve 112 and the second liquid supply valve 114. In addition, the double liquid valve 110 can be formed by two single liquid valves without departing from the spirit and scope of the present invention.

Additionally, the main agent can be glue, e.g. epoxy resin, polyurethane, silicone or the like, to mix with the hardener in a predetermined ratio, for example, 10:1. In some embodiments, the main agent can be mixed with the hardener in a suitable ratio without departing from the spirit and scope of the present invention.

In some embodiments, the first liquid supply valve 112 and the second liquid supply valve 114 are micro screw valves, for example, mono pumps, to deliver the required liquid. The mono pump has a double-ended spiral, a stator with an elastic cavity bushing, and a rotor meshing with the stator. When the rotor continuously rotates in the stator so as to form a sealed cavity in the axial direction, the main agent and the hardener are respectively inhaled from the first liquid inlet 116 and the second liquid inlet 118, and then output to the mixer 120 with the pressure action.

The mixer 120, connected to the double liquid valve 110, preferably has a shorter length and fewer blades to reduce the residence time of the main agent and the hardener in the mixer 120. In some embodiments, the mixer 120 has less than 12 mixing blades, preferably less than 10 mixing blades, so that the main agent and the hardener are fully mixed, and the residence time in the mixer 120 of the mixed liquid can be reduced. In some embodiments, the aforementioned blades are preferably a plurality of mixing blades formed by spiral blades, for example, 8 mixing blades.

The main agent and the hardener are fully mixed in the mixer 120 and delivered to the reciprocating glue dispenser dispensing switch 200 to dispense the mixed glue.

The traditional double liquid dispensing equipment utilizes a pin to open and close the double liquid dispensing equipment at the position of the needle thereof to allow the mixed glue to flow out or stop. Therefore, the traditional double liquid dispensing equipment may cause problems such as glue pulling, glue accumulation or thickness inconsistency during the dispensing process due to the open and close of the needle by the pin, thereby affecting the dispensing quality.

The reciprocating glue dispenser dispensing switch 200 can utilize a reciprocating switch to open or close the glue dispenser. The force for opening or closing the switch is perpendicular to the flowing direction of the mixed glue so that there is no pressure caused by opening or closing the switch to push the mixed glue at the needle, thereby improving the dispensing quality.

Referring to FIG. 2 and FIG. 3, the reciprocating glue dispenser dispensing switch 200 includes a switching device main body 210, a needle holding base 220, a sliding wear-resistant plate 240 and a driving device 230. The switching device main body 210 includes a double liquid inlet 270 to connect to the mixer 120 to receive the mixed glue. The needle holding base 220 has a mixed glue outlet 280 to connect to a needle 250.

The sliding wear-resistant plate 240 is disposed between the switching device main body 210 and the needle holding base 220. In addition, the sliding wear-resistant plate 240 has a sliding wear-resistant plate opening 242. The driving device 230 connects to the sliding wear-resistant plate 240 to move the sliding wear-resistant plate 240. A chute 290 is preferably formed between the switching device main body 210 and the needle holding base 220 to install the sliding wear-resistant plate 240 in the chute 290 and allow the sliding wear-resistant plate 240 moving in the chute 290.

When the double liquid inlet 270, the mixed glue outlet 280 and the sliding wear-resistant plate opening 242 are overlapped, e.g. three openings aligned with each other, the mixed double-liquid glue can pass through the double liquid inlet 270, the sliding wear-resistant plate opening 242 and the mixed glue outlet 280 to reach the needle 250 for dispensing the mixed glue.

In some embodiments, the double liquid inlet 270, the sliding wear-resistant plate opening 242 and the mixed glue outlet 280 can have the same diameter. In some embodiments, the double liquid inlet 270, the sliding wear-resistant plate opening 242 and the mixed glue outlet 280 can have different diameters without departing from the spirit and scope of the present invention. In addition, the reciprocating glue dispenser dispensing switch 200 can determine the flow rate of the mixed glue according to the size of the intersection of the openings of the double liquid inlet 270, the sliding wear-resistant plate opening 242 and the mixed glue outlet 280 without departing from the spirit and scope of the present invention.

In some embodiments, the reciprocating glue dispenser dispensing switch 200 further includes a driving rod 260 to connect to the driving device 230 and the sliding wear-resistant plate 240, so that the driving device 230 can move the sliding wear-resistant plate 240, thereby the sliding wear-resistant plate opening 242 can align with the double liquid inlet 270 and the mixed glue outlet 280.

Referring to FIG. 3, the driving device 230 can move the sliding wear-resistant plate 240 to allow the sliding wear-resistant plate opening 242 moving in the moving path 310 to open or close the mixed glue outlet 280.

In some embodiments, the double liquid inlet 270 and the mixed glue outlet 280 are located at a first position 320, and the sliding wear-resistant plate opening 242 is located at a second position 330. The driving device 230 moves the sliding wear-resistant plate 240 to move the sliding wear-resistant plate opening 242 of the sliding wear-resistant plate 240 to the first position 320, so that the double liquid inlet 270, the sliding wear-resistant plate opening 242 and the mixed glue outlet 280 are overlapped to allow the mixed glue to drop on the surface of a workpiece through the needle 250.

In some embodiments, the sliding wear-resistant plate 240 includes a polytetrafluoroethylene sliding wear-resistant plate.

In some embodiments, the driving device may include a pneumatic cylinder, a hydraulic cylinder, a linkage mechanism and/or a cam group without departing from the spirit and scope of the present invention.

Accordingly, the reciprocating glue dispenser dispensing switch can accurately dispense the glue for the electronic devices, and avoid causing push pressure on the glue when switching, thereby effectively improving the uniformity and stability in the dispensing process.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A double liquid dispensing equipment, comprising:
   a reciprocating glue dispenser dispensing switch, wherein the reciprocating glue dispenser dispensing switch comprises:
   a switching device main body having a double liquid inlet,
   a needle holding base having a mixed glue outlet,
   a sliding wear-resistant plate equipped between the switching device main body and the needle holding base, the sliding wear-resistant plate having a sliding wear-resistant plate opening, and
   a driving device moving the sliding wear-resistant plate, wherein a mixed double-liquid glue passes through the double liquid inlet, the sliding wear-resistant plate opening and the mixed glue outlet to dispense the mixed double-liquid glue when the double liquid inlet, the mixed glue outlet and the sliding wear-resistant plate opening are overlapped, wherein the double liquid inlet is aligned with the mixed glue outlet and a flowing direction of the mixed double-liquid glue from the double liquid inlet to the mixed glue outlet is completely perpendicular to the sliding wear-resistant plate; and
   a mixer connecting to the double liquid inlet of the reciprocating glue dispenser dispensing switch.

2. The double liquid dispensing equipment of claim 1, further comprising a double liquid valve connecting to the mixer.

3. The double liquid dispensing equipment of claim 2, wherein the double liquid valve comprises a first liquid supply valve and a second liquid supply valve.

4. The double liquid dispensing equipment of claim 3, wherein the reciprocating glue dispenser dispensing switch further comprises a needle fixed to the mixed glue outlet of the needle holding base.

5. The double liquid dispensing equipment of claim 3, wherein the reciprocating glue dispenser dispensing switch further comprises a driving rod connecting to the driving device and the sliding wear-resistant plate.

6. The double liquid dispensing equipment of claim 3, wherein the reciprocating glue dispenser dispensing switch further comprises a chute formed between the switching device main body and the needle holding base.

7. The double liquid dispensing equipment of claim 3, wherein the sliding wear-resistant plate comprises a polytetrafluoroethylene sliding wear-resistant plate.

8. The double liquid dispensing equipment of claim 3, wherein the driving device comprises a pneumatic cylinder.

9. The double liquid dispensing equipment of claim 3, wherein the driving device comprises a hydraulic cylinder.

* * * * *